US010348501B2

(12) United States Patent
Cocchi et al.

(10) Patent No.: US 10,348,501 B2
(45) Date of Patent: Jul. 9, 2019

(54) METHOD AND APPARATUS FOR A BLACKBOX PROGRAMMING SYSTEM PERMITTING DOWNLOADABLE APPLICATIONS AND MULTIPLE SECURITY PROFILES PROVIDING HARDWARE SEPARATION OF SERVICES IN HARDWARE CONSTRAINED DEVICES

(71) Applicant: SypherMedia International, Inc., Westminster, CA (US)

(72) Inventors: Ronald P. Cocchi, Seal Beach, CA (US); Michael A. Gorman, Cypress, CA (US); Jacob T. Carson, Long Beach, CA (US); Matthew A. Skubiszewski, Hermosa Beach, CA (US); David Ha, San Gabriel, CA (US)

(73) Assignee: Inside Secure, Meyreuil (FR)

( * ) Notice: Subject to any disclaimer, the term of this patent is extended or adjusted under 35 U.S.C. 154(b) by 250 days.

(21) Appl. No.: 15/207,332

(22) Filed: Jul. 11, 2016

(65) Prior Publication Data

US 2017/0012952 A1  Jan. 12, 2017

Related U.S. Application Data

(60) Provisional application No. 62/191,200, filed on Jul. 10, 2015.

(51) Int. Cl.
*H04L 29/06* (2006.01)
*G06F 21/00* (2013.01)
*H04L 9/14* (2006.01)
*H04L 9/32* (2006.01)
*H04L 9/08* (2006.01)

(52) U.S. Cl.
CPC .............. *H04L 9/14* (2013.01); *H04L 9/0836* (2013.01); *H04L 9/0866* (2013.01); *H04L 9/3263* (2013.01); *H04L 63/062* (2013.01); *H04L 63/0428* (2013.01); *H04L 2209/16* (2013.01); *H04L 2209/603* (2013.01); *H04L 2463/061* (2013.01); *H04L 2463/062* (2013.01); *H04L 2463/101* (2013.01)

(58) Field of Classification Search
CPC ... H04L 63/061; H04L 9/0836; H04L 9/3263; H04L 9/14; H04L 9/0866; H04L 2209/603; H04L 2209/16
See application file for complete search history.

(56) References Cited

U.S. PATENT DOCUMENTS 6,701,528 B1   3/2004  Arsenault et al.
6,744,892 B2   6/2004  Akins, III et al.
8,281,359 B2  10/2012  Gagnon et al.
(Continued)

*Primary Examiner* — Lisa C Lewis
(74) *Attorney, Agent, or Firm* — Gates & Cooper LLP

(57) ABSTRACT

A method, apparatus, article of manufacture, and a memory structure for providing a security infrastructure that permits the programming of limited hardware resources that can accept newly downloaded applications and securely support a very large number of services offered by content providers each have the potential to utilize their own independent CAS/DRM system. The CE device owner can consume content from a variety of sources and enable switching among different and existing CAS/DRM security profiles as required by the content provider applications loaded in CE devices.

23 Claims, 11 Drawing Sheets

(56) References Cited

U.S. PATENT DOCUMENTS

2010/0250388 A1\* 9/2010 Lee .................. G06F 21/10
 705/26.1
2016/0352711 A1\* 12/2016 Kohiyama ............ G06F 21/10
2017/0318263 A1\* 11/2017 Cocchi ................ H04N 21/472
2018/0145988 A1\* 5/2018 Carson ................ H04L 63/104

\* cited by examiner

METHOD AND APPARATUS FOR A BLACKBOX PROGRAMMING SYSTEM PERMITTING DOWNLOADABLE APPLICATIONS AND MULTIPLE SECURITY PROFILES PROVIDING HARDWARE SEPARATION OF SERVICES IN HARDWARE CONSTRAINED DEVICES

CROSS-REFERENCE TO RELATED APPLICATIONS

This application claims benefit of U.S. Provisional Patent Application Ser. No. 62/191,200 by Ronald P. Cocchi, Michael A. Gorman, Jacob T. Carson, Matthew A. Skubiszewski, and David Ha, filed Jul. 10, 2015, which application is hereby incorporated by reference herein.

BACKGROUND OF THE INVENTION

1. Field of the Invention

The present invention relates generally to systems and methods for securely providing media programs to consumers, and in particular to a system and method for providing such media programs using multiple, customizable and field alterable security profiles for use with hardware constrained devices.

2. Description of the Related Art

The provisioning of information such as media programs to remote consumers is well known in the art. Such provision may be accomplished via terrestrial or satellite broadcast, cable, closed circuit, or Internet transmission to consumer electronics (CE) devices at the consumer's home or office.

A common problem associated with such transmission is assuring that the reception and decryption of such information is limited to authorized end-users. This problem can be solved via the use of encryption and decryption operations performed by devices with appropriate security functionality. For example, it is well known to encrypt media programs before transmission to CE devices with electronics and processing that permits the encrypted media programs to be decrypted and presented to only authorized users.

To implement this functionality, the CE products typically include keys, software, and other data. Since such data is of value to unauthorized users as well, CE companies and content providers need a way to protect this valuable information.

Typically, this has required the production of CE devices with special integrated circuits, such as System on Chips (SoC), with security features enabled and information needed to perform the security functions loaded into SoC memory. Such SoCs also comprise the primary Central Processing Unit (CPU) of the CE device (which may also include secondary processors, security processors, custom ASICSs, etc.), Trusted Execution Environments (TEEs), or other SoC devices that perform the processing of commands within a CE device such as a set top box (STB), integrated receiver/decoder (IRD) or a smart television.

Conditional Access System (CAS) and Digital Rights Management (DRM) providers provide content protection schemes to secure broadcast and broadband content. Problems may occur when the new services are offered by content providers or alternate distribution mechanisms are utilized, because the fielded CE devices may not have sufficient hardware resources (e.g. memory, processing speed or functionality) to support the desired CAS/DRM system, particularly if the CE device is asked to support multiple independent CAS/DRM systems.

SoCs may be programmed with data or instructions on a "one time" basis. So programmed, such data (known as one time programmed (OTP) data) cannot be altered or changed. While it is possible to OTP program a SoC to support an adequate hardware root of trust for tens, hundreds or thousands of independent CAS/DRM systems that must reside in the CE device at one time, this would make any such SoC less cost competitive to manufacture when compared to other designs. Further, it is extremely expensive to design, manufacturer and distribute such CE devices, even without such expanded OTP programmable capabilities. Significant savings can be achieved if a content provider, CE device manufacturer or broadcaster can extend the use of existing CE devices and their SoCs by adding and/or replacing the CAS/DRM providers used with fielded CE devices (e.g. CE devices that are distributed to or in use by customers).

What is needed is a system and method for providing a security infrastructure that permits the programming of limited hardware resources that can accept newly downloaded applications and securely support a very large number of services offered by content providers each have the potential to utilize their own independent CAS/DRM system. Such a device would permit the CE device owner to consume content from a variety of sources and enable switching among different and existing CAS/DRM security profiles as required by the content provider applications loaded in CE devices. A system and method satisfying that need is presented below.

SUMMARY OF THE INVENTION

To address the requirements described above, the present invention discloses a method, apparatus, article of manufacture, and a memory structure for securely providing a process for generating a root key using by a limited hardware resources in a CE device. The invention may be practiced in a system comprising at least one of a plurality of content providers providing media programs to consumers encrypted according to at least one of a plurality of conditional access systems provided by an associated conditional access system provider. In one embodiment, the root key is generated by operations comprising receiving content provider data comprising a content provider key (Kcp) unique to the at least one content provider; receiving conditional access system data comprising an identifier of the at least one conditional access system (CA_ID) and a customer product secret (CPS) unique to the associated conditional access system provider; generating a profile key from the customer product secret (CPS) and the identifier of the at least one conditional access system (CA_ID); receiving a chip key (SSK); and generating a root key at least in part according to the profile key, the chip key (SSK), and the identifier of the at least one conditional access system (CA_ID). In another embodiment, the invention is evidenced by a processor and a communicatively coupled memory storing instructions for performing the foregoing operations.

The disclosed system and method provides a CAS and DRM independent BlackBox Programming and Security architecture supporting multiple concurrent CAS and DRM implementations. In selected embodiments, this is accomplished by using key extracted from signed certificates as input to symmetric encryption algorithms used for key derivation; by using data extracted from signed certificates as input to symmetric encryption algorithms that are used for key derivation; to generate customer specific, unique key database for SoC population re-using OTP hardware resources; and to accept new content provider applications and security profiles in fielded CE devices' to be able to switch between a very lager number of content provider applications and security profiles using key derived keys seeds from OTP hardware black box programmed values.

The resulting security architecture provides instantaneous switching between security profiles offered by CAS and DRM providers, provides a foundation offering reuse of a Hardware Root of Trust Security key to protect high value content with easy integration with CAS and DRM security providers as well as content provider systems, and enables new content distribution mechanisms for fielded CE devices.

BRIEF DESCRIPTION OF THE DRAWINGS

Referring now to the drawings in which like reference numbers represent corresponding parts throughout.

DETAILED DESCRIPTION OF PREFERRED EMBODIMENTS

Figure 1A:
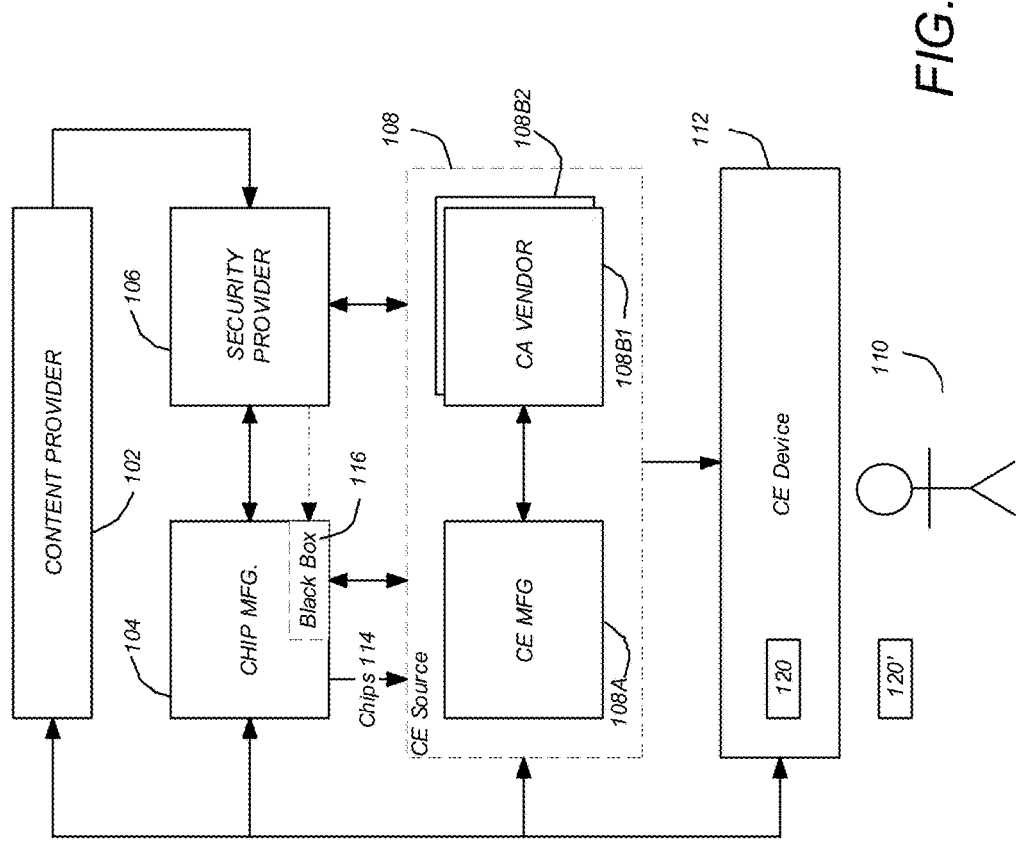
FIG. 1A is a diagram of selected architectural entities described in this disclosure.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The following discussion describes a system and method for securely providing data for use by a security processor residing in consumer electronics (CE) device such as a television (TV), tablet, mobile communications device, or Set Top Boxes (STBs) for receiving paid content using conditional access system (CAS) or digital rights management (DRM). The security processor can be implemented by, for example, a dedicated central processing unit (CPU), smart card, Trusted Execution Environment (TEE), dedicated security co-processor, or Application Specific Integrated Circuit (ASIC). The security processor is commonly integrated into a larger System on Chip (SoC) as found in these CE devices.

The disclosed system and method that allows fielded CE devices to support a very large number of CAS/DRM security profiles with limited hardware root of trust resources, thus enabling consumers to purchase content directly from a plurality of content providers. Using the systems and techniques described below, consumers can switch between content provider applications by changing channels, streams and/or applications and may view Over the Top (OTT) content from a variety of providers on the CE device.

The system and method disclosed herein allows CE device manufacturers and content providers to utilize high security SoC features to enable in-field updates to their CE devices to download additional applications and services for their consumers to view content. This is possible in part, due to a set of base security features that can be integrated into commercially available integrated circuitry for use in CE devices, yet customizable for many different applications. Further, some embodiments use black box programmed secure silicon features that allow content providers and CE device manufacturers to enable new services and consumer direct content purchases months or years after the CE device was manufactured and used in a home.

The system and method described herein also permits programming of unique secrets into the SoC at the SoC manufacturing site and permits later allocation of these SoCs to any one of a number of potential CE device manufacturers and many independent CAS/DRM vendors. SoC programming can also occur at the packaging or product manufacturing facility by execution of an in-field programming sequence on the SoC.

In some embodiments, a Hardware Root of Trust Security is offered for high value content with easy integration with a CAS and DRM technology to enable many content providers to provide their media programs directly to consumers using their CE devices. This is accomplished by use of a security provider independent architecture supporting multiple concurrent CAS and DRM implementations on a single black box programming security platform with limited One Time Programming (OTP) resources to store secrets representing the hardware root of trust. This security architecture provides for instantaneous switching between security profiles offered by CAS and DRM providers. This is also accomplished by allowing SoCs with limited OTP resources to store security keys enable different security schemes by altering the key generation inputs that derive content provider (i.e. Customer) unique key outputs. The term Customer in this context is to be broadly construed and reflects the entity who would use the derived key database for a population of fielded CE devices to protect their content for purchase by an entity who had a particular CE device in their home. These content provider unique key generation outputs enable support for multiple security providers for fielded CE devices typically found in televisions (TVs), Smart TVs and mobile devices. The black box security provider provides compatible headend applications to each content provider, so that the media programs are encrypted or otherwise protected using the DRM implementation used.

The keys and programming infrastructure summarized above as provided by an independent black box security provider enables fielded CE devices to add additional revenue baring applications to the CE device manufacturer or content provider giving these entities more flexibility in managing their business and offering new services. Enabling the ability to add applications supporting new CAS/DRM vendors in fielded CE devices can result in generating significantly higher content sale revenues without required consumers to upgrade their CE devices. Consumer savings are realized by extending the field life of the CE device by allowing the consumer to download new software images to enable the purchase of new content services without having to replace their fielded CE devices.

As an alternative to constantly switching CAS/DRM systems (impractical when supporting a larger of content provider applications and security profiles in a real time situation where consumers can frequently change channels on the CE device), the CE device can be designed and provisioned to support separate and cryptographically isolated CAS/DRM systems during manufacture while re-using the limited hardware resources. This permits the content providers to offer new services via direct distribution for fielded devices. Since new applications can be downloaded to the CE device, such service may have never been envisioned when the CE device was manufactured.

Architectural Entities

FIG. 1A is a diagram of selected architectural entities described in this disclosure. They include a content provider 102, a SoC manufacturer 104, a security provider 106, a third party vendor(s) 108 and consumer(s) 110. The content provider 102 transmits media programs and information to consumer electronics (CE) device(s) 112 that are deployed to consumers 110. The CE device 112 receives the media programs from the content provider 102 and presents the media programs to the consumers 110.

The CE device 112 can include devices such as televisions, laptop computers, tablet computers, set-top boxes (STBs) integrated receiver/decoders (IRDs), smart TVs, portable CE devices such as cellphones or personal data assistants (PDAs), and desktop computers. Any device with the required processing and memory capacity having the proper programming or hardware can be used as a CE device. An exemplary IRD is disclosed in U.S. Pat. No. 6,701,528, which is hereby incorporated by reference herein.

To assure that only authorized consumers 110 receive the media programs and information, the CE devices 112 perform security functions that are implemented at least in part using hardware processing/memory devices 114 (hereinafter alternatively referred to as SoCs) that are produced by SoC manufacturer 104. For example, the transport module of the IRD disclosed in U.S. Pat. No. 6,701,528, is typically implemented by a SoC.

Figure 1B:
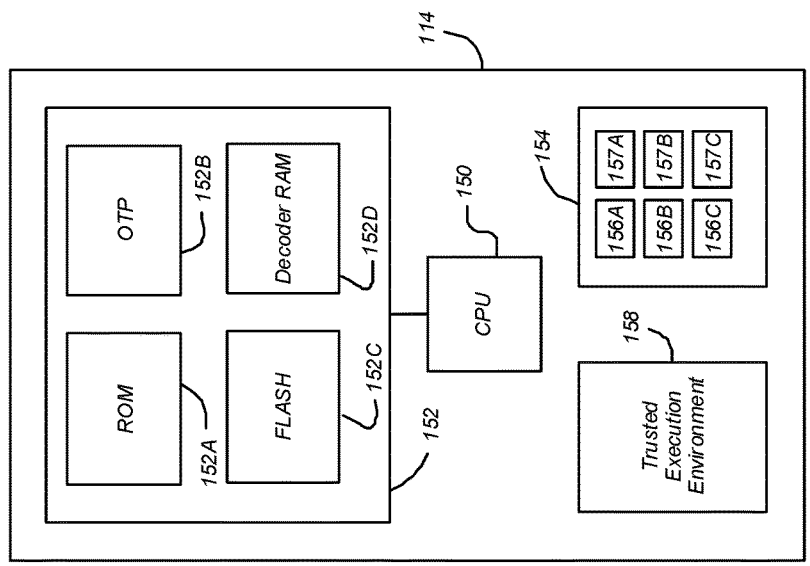
FIG. 1B is a diagram of an exemplary SoC.

FIG. 1B is a diagram of an exemplary SoC 114. The SoC 114 comprises memory 152 communicatively coupled to a processor or CPU 150. The memory 152 stores instructions and/or data such as keys that are used to implement the CAS/DRM functionality of the CE device 112. The memory 152 may include read only memory (ROM) 152A, one-time-programmable memory (OTP) 152B, flash memory 152C and decoder random access memory (RAM) 152D. The SoC 114 may also comprise a configuration portion 154, which may include a series of fuses 156A-156C (hereinafter alternatively collectively referred to as fuses 156 and/or flags 157A-157C (hereinafter alternatively collectively referred to as flags 157). The flags 157 may also be reflected by values in the memory 152. The fuses 156 are irreversibly activated by the SoC manufacturer 104 to implement particular SoC 114 functionality. For example, activation of fuse 156A may activate a triple data encryption standard (DES) functional capability of the SoC 114, while fuse 156B may activate AES, RSA or ECC encryption functionality.

SoCs also comprises a security processor 158 (also known as the trusted execution environment or TEE 158) that executes CAS/DRM functions as well as the security operations described below.

The CE devices 112 are manufactured by a CE source 108. In one embodiment, the CE source 108 is defined to include a particular CE device assembler 108A that is responsible for the completing the manufacture of a CE device 112 having hardware and software capable of implementing the CA functions allocated to the CE device 112 by a particular CA vendor 108B, which provides the instructions and data (for example, software and keys) that are used by the CA device 112 hardware to implement the CA functions required for the CA system used by the content provider 102. A particular CE source 108 is identified by a particular CE device assembling 108A a product used with a particular CA system from CA vendor 108B used with the CE device 112.

In one embodiment, the CE device 112 is capable of downloading tens or even hundreds of applications from content providers 102 offering direct content purchases from their program library such as movies, sporting events or traditional broadcast networks. Each content provider 102 can use its own CAS/DRM security profile that performs the content protection functions within the TEE 158 in the CE device 112.

For example, a first content provider uses CAS/DRM vendor 108B1 defines its content protection system and a second content provider uses CAS/DRM vendor 108B2 may define a second content protection system. Each content protection system uses the same, limited OTP resources 152B as the hardware root of trust protection with content provider-unique key generation system executing in the TEE 158. The CE device 112 may support many content providers 102 each with their own content provider application and CAS/DRM systems by storing instructions and data that allow the CE device hardware to perform the CAS/DRM functions allocated to the CE device 112. Thus, a fielded CE device 112 may be capable of performing the key generation needed to receive and decrypt media programs and data transmitted by many different content providers (for example, Olympics, FIFA, Sony Pictures and ESPN).

In another embodiment, the CE device source 108 may also include one or more CAS/DRM vendors 108B that are architectural entities separate from the CE device assembly 108A. For example, the CE device 112 may employ a smart card 120 (for example, as shown by the access card of FIG. 2 of U.S. Pat. No. 6,701,528), dongle 118 U.S. Pat. No. 8,281,359) or other removable security device having security functions defined by the CAS/DRM vendor 108B. The CAS/DRM vendor 108B may manufacture and provide this security device such as a smart card 120 or dongle 118 for CE device assembly 108A or content provider for ultimate provisioning to the consumer(s) 110 with the CE device 112.

The CE source 108 may accept SoCs 114 from the SoC manufacturer 104 and install them into the CE device 112. As described below, the present invention allows the SoCs 114 to be a standard design, yet uniquely and programmable so as to be useful for CE devices 112 from different CE device assemblers 108A, and that can accept downloadable content provider applications with CAS/DRM functionality for multiple CAS/DRM systems.

In one embodiment, the SoCs 114 are programmed via use of a black box 116 provided by a third party security provider 106. The black box 116, as the name implies, is a device that performs a transformation of data such as code or keys, without revealing how the transformation is performed or disclosing the data. The use of the black box 116 in this instance, allows the black box security provider 106 to program instructions and/or data into the SoC 114 at the SoC manufacturer's facility and under the control of the SoC manufacturer 104 without exposing that information and/or data itself to the SoC manufacturer 104. The black box programs the limited OTP resources 152B so that the key generation scheme running in the TEE 158 can derive unique keys for each content provider for use in their CAS/DRM system.

In one embodiment, a key may be used to protect a Joint Test Action Group (JTAG) port on the chip 114 that is used to obtain access to higher security areas of the chip 114 (e.g. the chip's internal states). The value for this key can be programmed by the black box 116 during chip 114 manufacturing. In one embodiment, the key is a 128-bit JTAG key. The JTAG key should be a 128-bit value. Smaller value JTAG key lengths are acceptable if there is a delay function between successive password unlock attempts. For adequate security, the key length should be at least 64 bits in length. The JTAG password unlocks access to debug information and is only provided if the CE device 112 experiences an in field failure. Supplying the proper JTAG password to a CE device 112 can allow access to code sections for the central CPU 150, however access to security sections such as the TEE 158 and regions storing secret keys or flags 156 and 158 is typically not allowed. Data from the black box security provider 106 or the content provider 102 may also be programmed into the SoC 114 at the CE source 108 or the consumer 110 location using the techniques described below.

Horizontal and Vertical SoC Markets

As described above, the CE devices 112 may include STBs, smart TVs and mobile devices. STBs are typically used in vertical markets where a given operator specifies the manufacturing specification and approves the STB for use in their content delivery system. The STB typically is not usable or used by other entities outside this operator's system.

Figure 2:
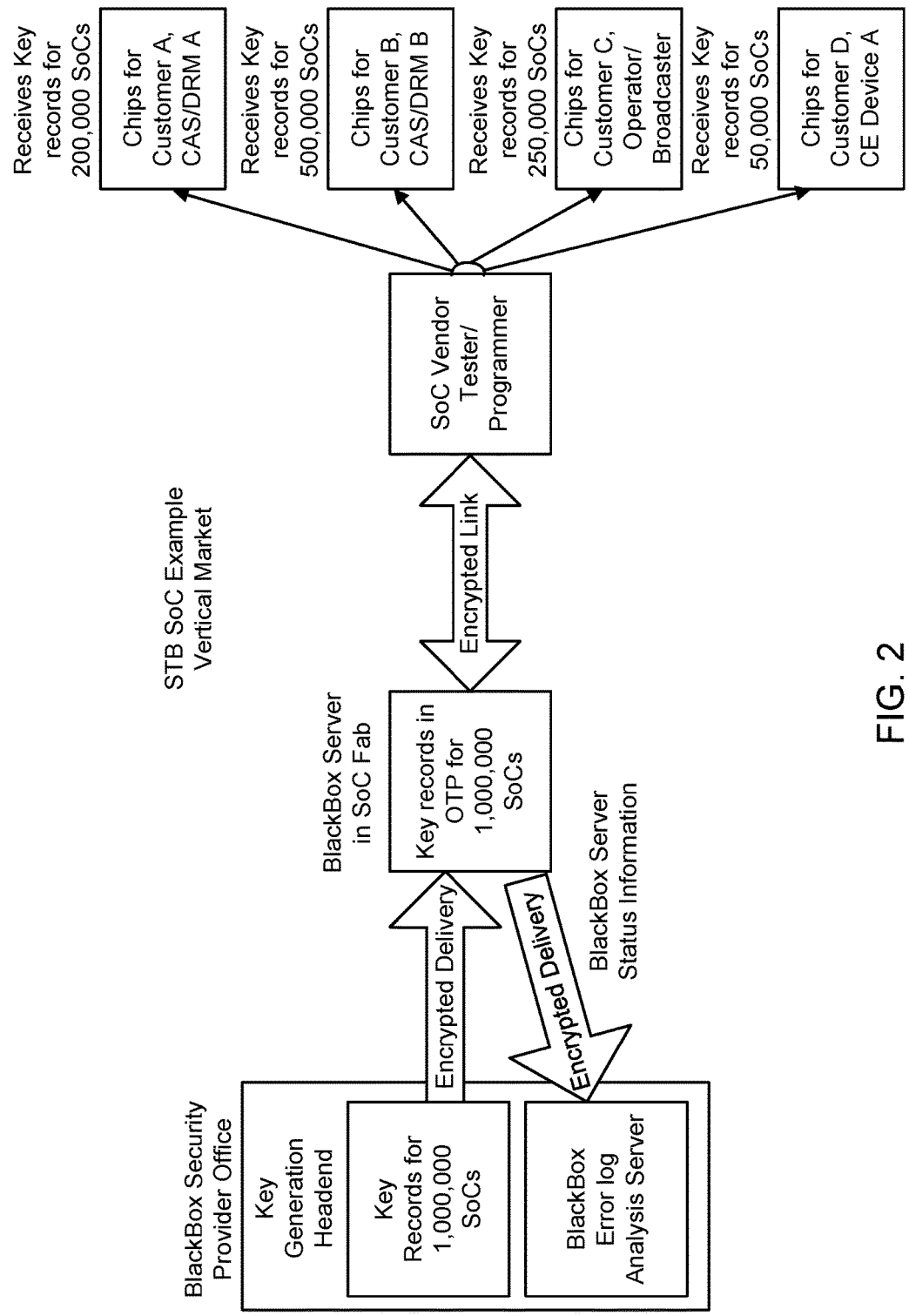
FIG. 2 is a diagram illustrating a vertical market where the SoC are installed in CE devices that are delivered to distinct customers or operators.

Conversely, smart TVs and mobile devices are used in horizontal markets where the device itself may be used by a number of content providers, each using a different DRM scheme. Accordingly, the SoCs 114 used in TVs, Smart TVs, and mobile device are typically different from those used in STBs. FIG. 2 is diagram presenting an example of a vertical market of a SoC 114 used in an STB. In the illustrated embodiment, 1,000,000 SoCs that are black box programmed demonstrate a vertical market where the SoC are installed in CE devices 112 that are delivered to four distinct customers or operators. Customer A receives SoCs (chips) for use in CAS/DRM system A, which requires 200,000 keys. Customer B receives SoCs for use in CAS/DRM system B, which requires 500,000 keys. Customer C receives SoCs for CE device A, which requires 250,000 keys, and Customer D receives SoCs for CE device B, which requires 50,000 keys. Each of the devices in which the SoCs are used is linked to a specific service or content provider, and each needs to be programmed with specific keys that are to be used in each customer's DRM scheme.

The SoCs 114 in TV, smart TV, and mobile device applications differs in that such SoCs 114 are not typically linked to a specific broadcaster or content provider 102, but rather used with multiple different content providers 102. Hence, since content providers 102 require that SoCs used in horizontal market applications protect high-value media programs with unclonable and difficult to subvert hardware resources, a particular SoC will be required to support the DRM scheme used by more than one content provider. This requires either that the SoC 114 have sufficient memory to be store keys for each content provider 102, or have some way of generating such keys for each content provider 102. The generation of such keys is via the use of a non-mutable hardware root of trust.

Applying hardware resources such as seeds to cryptographic operations is an example where non-mutable hardware root of trust can be used to significantly enhance system security. Other example such as software protection mechanisms so that the content can be protected and securely delivered from the content provider 102 directly to the CE device 112 are significantly enhanced using hardware resources. There are tens to hundreds of content providers 102 with the number of media program sources generating content almost doubling every few years. Since the hardware resources available in SoCs 114 of CE devices 112 are limited, it is not possible to provide a dedicated set of encryption keys in each SoC to every content provider 102. A scheme to securely support an ever-growing number of content providers 102 to direct viewing on the CE devices 112 needed. This disclosure describes a method to securely generate a unique key database based on Hardware Root of Trust using OTP 152B cells residing in the SoC 114 of the CE device 112.

Figure 3:
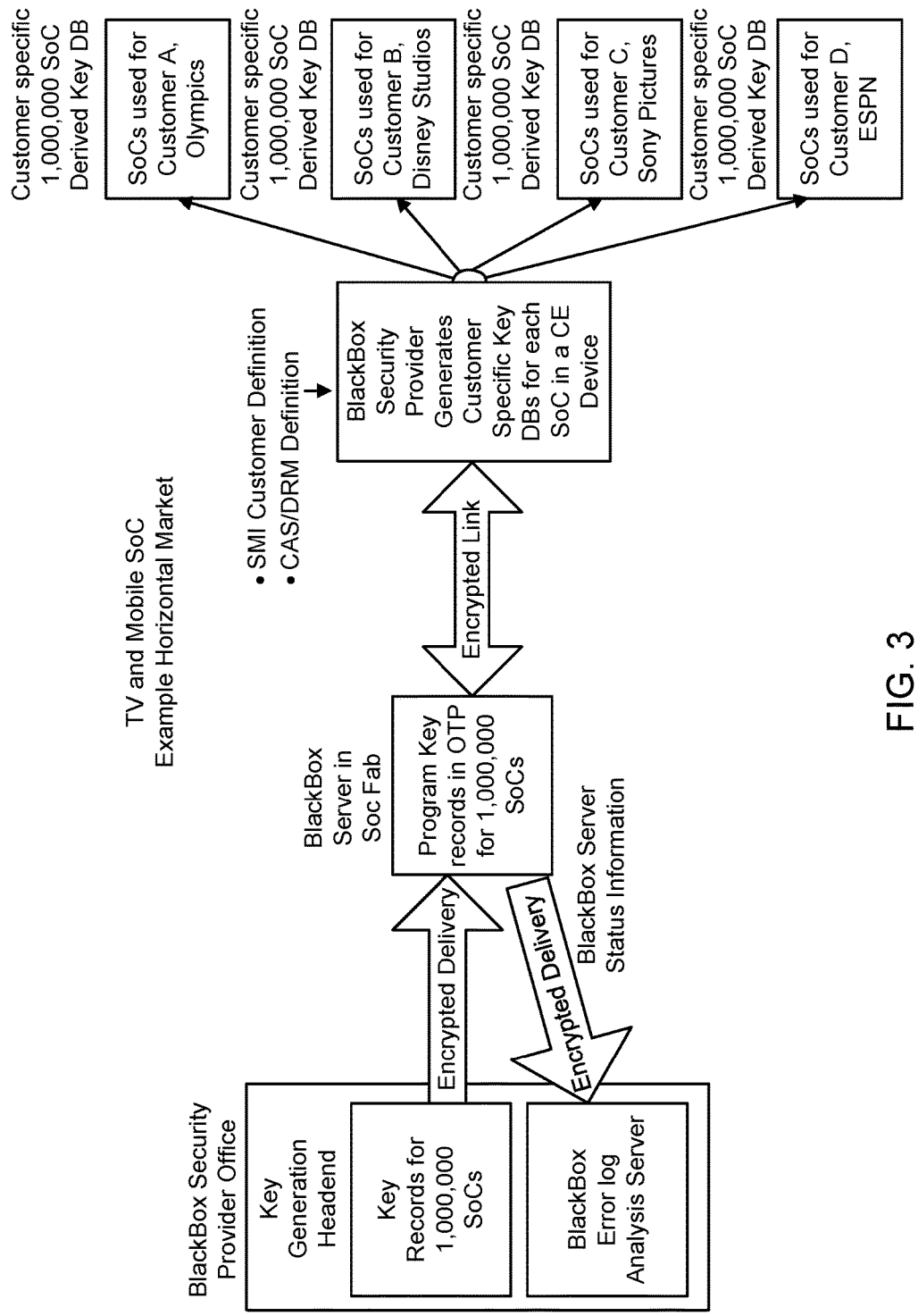
FIG. 3 demonstrates a horizontal market where a single OTP region is black box programmed and installed in CE devices for purchased by Consumers who may purchase content from multiple content providers.

FIG. 3 is a diagram presenting a demonstration of a horizontal market where a single OTP region in 1,000,000 TV/Mobile SoCs are black box programmed and installed in CE devices 112. These CE Devices that are purchased by consumers 110 that may buy/view content from any one of a number of content providers 102 each with their own unique key generation database. The unique key generation database allows each content provider 102 reuse a scarce hardware resource, i.e. OTP, in the SoC 114 of the CE device 112. Key generation scheme also enable a commercial benefit where the content provider 102 can encrypt content according to their own key database with no risk of compromised if a key generation database of another content provider 102 becomes inadvertently release or hacked by an attacker.

This enables a unique key database to be generated for each content provider 102 (or customer in the context of FIGS. 2 and 3) who wishes to offer a content delivery service such as Over The Top (OTT) or Internet direct delivery using the TV and mobile SoC that may reside in a CE device 112 such as a Smart TV or mobile device.

It should be noted that a similar content service using a customer-unique key database could be offered using a dongle connected to a non-Smart TV or tethered to a mobile device. A dongle can enable any TV our mobile device without an advanced SoC to security receive content provider direct purchases for high valued content. The content may be securely delivered to the secure SoC 114 in the dongle from the content provider's distribution site as described in this application. The dongle decrypts the received content and re-encrypts the content for output to the TV/mobile device according to the capabilities found in the TV/mobile device, i.e. HDCP, CI+, Cable Card, etc. The communication between the dongle and TV/mobile device could also employ encryption using either hardware or software systemic key encryption such as AES, DES, Triple DES, etc., or asymmetric algorithms such as RSA or ECC.

The customer offering such service are likely to be content providers, studios, and broadcasters, such as HBO, ESPN, FIFA, Sony Pictures, Disney, and Olympics Games. It is also possible for the customer to be a security provider offering CAS or DRM Services.

This scheme enables the customer, i.e. content provider 102, to offer consumers who purchase TVs to the ability to directly purchase and consume their content via content direct distribution OTT and Internet delivery using a secure, Hardware Root of Trust, end-to-end protection mechanism.

Application

Secret SoC Keys (SSK) Use to Protect Sensitive Data

One or more secret security keys can be programmed by the black box security provider 106 to be stored in the SoC 114 OTP memory 152B. Those security keys can be used to indirectly modify or manipulate sensitive data that is externally supplied to the SoC 114. Such sensitive data can be supplied from the CE device manufacturer 108A via a broadcast/stream/download, a third party CA vendor 108B, a USB port, Internet server, DVD or similar means.

Product Identifier (PID) Assigned to Arbitrary Customers

Figure 4:
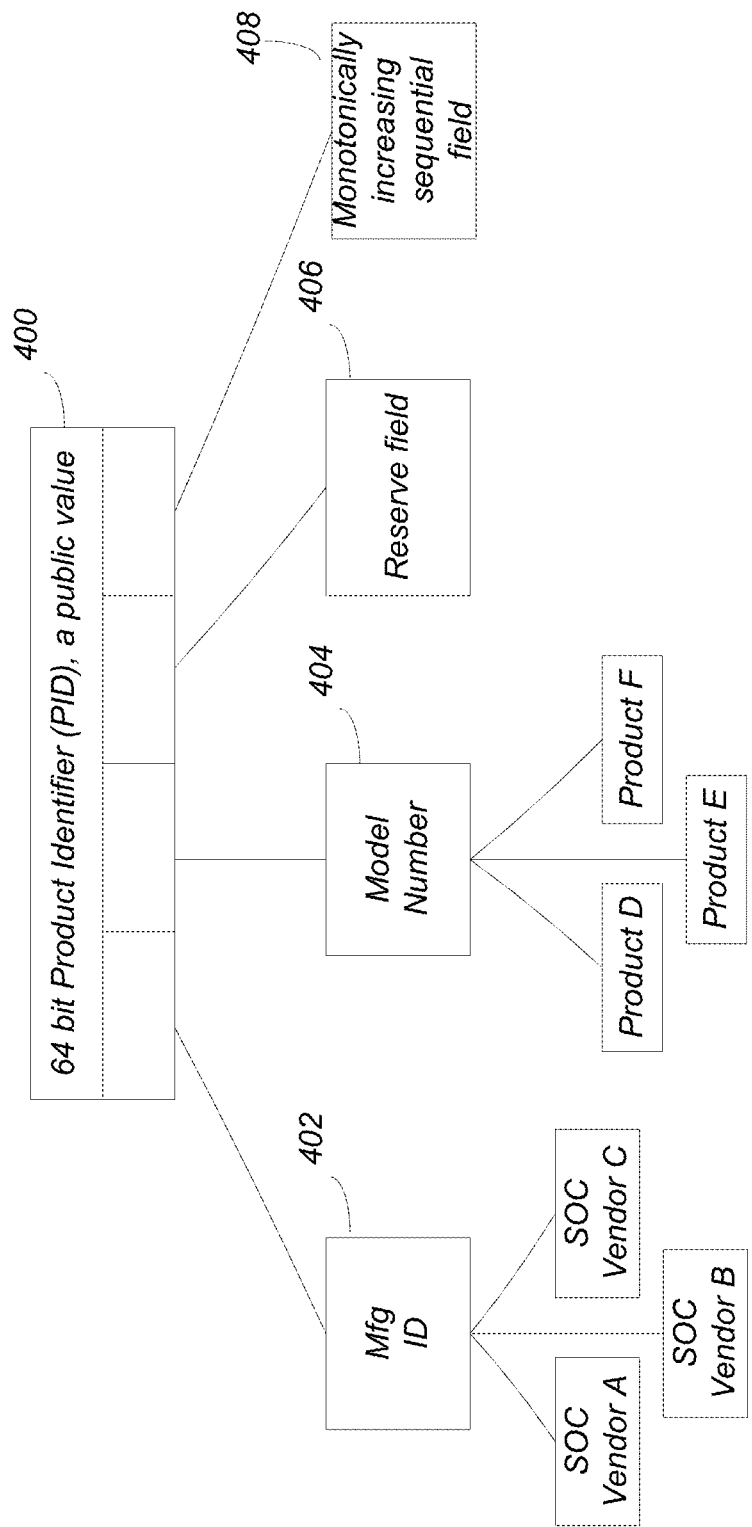
FIG. 4 is a diagram of one embodiment of a product identifier (PID)

FIG. 4 is a diagram of one embodiment of the product identifier (PID) 400 used to describe the Product Identifier (PID) or Chip Identifier of the SoC. The PID 400 identifies the specific SoC 114 (not just the SoC 114 configuration) and may be provided to the CE source 108 after the SoC 114 is manufactured. In one embodiment, the PID is a 64 bit Public CE Device ID that is generated by the block box security provider 106 and programmed in the SoC 114 by the black box 116.

The security provider 106 ensures that the PIDs 400 are globally unique across all supported products, that is, across multiple SoC manufacturers 104 and multiple content providers 102. A system-wide unique value is needed to ensure that any manufactured SoC 114 can be allocated to any customer.

In one embodiment, the PID 400 consists of a SoC manufacturer identifier 402, a model number 404 that specifies the type of SoC 114 produced by that SoC manufacturer 104, a reserve field 406 for future use and a monotonically increasing serial identifier 408 to uniquely identify the SoC 114 within the product family and manufacturer.

KDF Resource Summary

Table I describes exemplary keys and memory sizes that may be used in generating the root keys as described further below.

TABLE 1

Key Generation Summary Resource Allocation Table

| Key Name | ROM/ OTP Size (bits) | OTP Size (bits) | Flash Size (bits) | When programmed |
|---|---|---|---|---|
| the black box security provider RSA public key stored in security region | 2048 | | | SoC manufacturer or Black box for OTP |

TABLE 1-continued

Key Generation Summary Resource Allocation Table

| Key Name | ROM/ OTP Size (bits) | OTP Size (bits) | Flash Size (bits) | When programmed |
|---|---|---|---|---|
| Obfuscated Customer Product Secret (OCPS 518) | | 256 | | black box |
| Encrypted Secret SoC Key (ESSK 504) Common | | 128 | | black box |
| Encrypted Secret SoC Key (ESSK 504) Unique | | 128 | | black box |
| Product ID (PID) Public Device ID | | 64 | | black box |
| Customer RSA Public key the black box security provider signed | | | 2048 | In Field |
| Signed Customer RSA key and Customer Product Differentiator | | | 2048 | In Field |
| Customers signature over signed code | | | 2048 | In Field |
| Total | 2048 | 576 | 6144 | |

Figure 5:
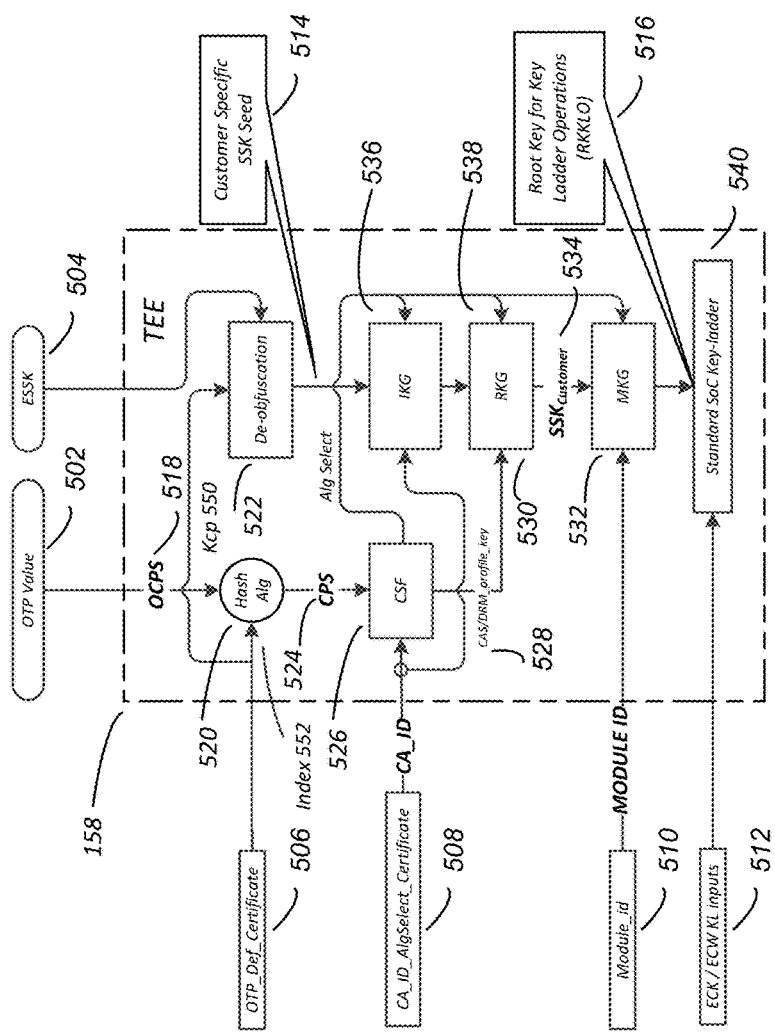
FIG. 5 illustrates the key generation process for deriving content provider (or programming system customer) unique key databases using limited hardware resources.

FIG. 5 is a diagram presenting an exemplary apparatus for generating and using a root key. The details of this process are discussed in the sections below.

Key Generation Input Description and Operation

The root key generation discussion has three input parameters for a given Customer.

a) Software OTP Config Certificate 506. The Software OTP Configuration Certificate provides content provider 102 separation (allows different keys to be generated for different content providers 102) using a software value that can be changed in the field via a software download, which enables instantaneous switching between content and security provider policies for fielded CE devices 112. This certificate includes a customer (content provider 102) unique symmetric key such as a 128 bit AES key and an index into the Obfuscated Customer Product Secret (OCPS 518) or CPS array.

b) Software CA ID Certificate 508. This adds security provider 108B separation using a software value that can be changed in the field via a software download, which enables CA Switching for fielded CE devices 112. This certificate contains a CA Identifier (CA ID), an algorithm select value or function to define the cryptographic operation type and mode used in the key generators 536, 538 and 532, and an optional CAS/DRM specific 128 bit key that can be used in hash function or as data in a given calculation to derive for example a content provider and CAS/DRM specific customer key or $SSK_{Customer}$ 534.

c) Software Module ID 510. This enables a unique output based on the designated hardware output module, i.e. DES, AES, Mem-2-Mem, etc.

For TV and mobile SoCs 114 the root key 516 generation and key-ladder operations are to be executed within the confines of a Trusted Execution Environment (TEE) 158. Given the limited amount of one-time-programmable (OTP) memory 152B, software execution environment, and the possible lack of field programmable OTP cells (i.e. use of OTP technology such as eFuse), the design has been augmented with the introduction of signed certificates that help enhance the security robustness and increase the difficulty of an attack.

It is assumed that there will be OTP 152B that will be initialized at time of CE device 112 SoC 114 manufacturing for a given production run. A certificate is used to create uniqueness for use amongst a population of content providers 102 and content owners. The certificate contains a content provider 102 unique key for the hash function. The certificate also contains an index into the OTP Customer Product Secret (CPS) array (Obfuscated Customer Product Secret (OCPS) 518)) that is used as data in a keyed-hash function to create a configurable and customer (content provider 102) unique CPS 524. If there is not enough OTP memory to store the CPS array, the CPS 524 may be generated from other data delivered and/or programmed into the SoC 114 such as that contained in the Certificates and Black box programmed data.

Another certificate 508 is used to convey the Conditional Access (CA) identifier and the algorithm to be used in the key generation functions.

The SSK 514 (which may be stored in obfuscated form in the OTP 152B is the base key used by the below described operations to generate the root key 516 that will be the root of the CAS/DRM Key Ladder 540 used by the security provider 108B. This is shown as ESSK 504 in the figure because the value will later be decrypted or de-obfuscated based on data extracted from the unique customer certificate OTP_Def_Certificate 506. The decrypted or deobfuscated result is to become the SSK Seed 514 for use in generating the root key 516.

The CA_ID is extracted from the signed certificate CA_ID_AlgSelect_Certificate 508 using an asymmetric algorithm such as RSA or ECC decrypt and verify operation. In one embodiment, the signed certificate OTP_Def_Certificate 506 contains a customer (content provider 102) unique symmetric key (Kcp) such as a 128 bit AES key and an index into the OCPS array 518, which is extracted from the certificate using an asymmetric algorithm such as RSA or ECC. The index into the OCPS array 518 is used as a starting point in the 256 bit CPS array to obtain 128 bits of data use with the extracted symmetric content provider key (Kcp) in the keyed hash algorithm to produce the CPS 524. If the OCPS array 518 is not present due to OTP 152B space constraints in the SoC 114, then the data such as the Customer unique OTP_Def_Certificate 506 and the black box programmed unique ESSK 504 can be used in the keyed hash to produce the CPS 524. The OTP_Def_Certificate 506, CA_ID_AlgSelect_Certificate 508, and key generation database of SoC unique $SSK_{Customer}$ values are provided to the content provider 102 for use in their content protection scheme by the selected CAS/DRM vendor 108B. The ESSK 504 is a black box programmed OTP value such as SSK Common or SSK Unique as shown in Table 1. One of these values in used by the deobfuscator of FIG. 5, which can employ a symmetric cryptographic operation such as AES, DES, Triple DES, etc. or similar function such as a hash operation like SHA1, SHA256, or HMAC. The de-obfuscation function performed by the deobfuscator 522 allows each entity receiving a derived key database to start with a different set of hardware root of trust based seeds. The inputs to this operation are the extracted symmetric key from the OTP_Def_Certificate 506 and an ESSK 504 value from OTP 152B. The result from this cryptographic operation produces the SSK Seed 514.

Inputs from OTP 152 to the TEE 158 environment are contained in ovals at the top of the FIG. 5 while software values are contained in rectangles to the right of the figure. Encryption/decryption functions and key generator blocks inside TEE 158 can be implemented using cryptographic algorithms such as AES, CSA, CSA2, CSA3, DES, triple DES, Idea, etc. Tradition Key Ladder (KL) such as an Encrypted Content Key (ECK) or Encrypted Control Word (ECW) are used in conjunction with the output of the customer unique key generation output also called root key 516 for key ladder operations (RKKLO) 516 to produce the decryption key necessary to decrypt the purchased content. This final process of deriving the content protection key using the generated key, RKKLO 516, is outside the scope of this application. These steps in this process are the similar to those in traditional CAS/DRM systems where ECKs and ECWs are used to produce a produce the decryption key necessary to decrypt the purchased content as can be found in Akins U.S. Pat. No. 6,744,892.

An example of such a key data base generated from two sample SoCs 114 is shown in Table 2. The root key 516 generated value derived from the SSK 514 Common value is the same for all PIDs (i.e. for all SoCs 114 in the same product family programmed with the same black box 116 provided value) and the root key 516 generated value derived from the SSK Unique value is different of all SoCs 114, i.e. for each content provider 102 derived root key 516 with the same PID and for each content provider 102 derived key with different PIDs.

TABLE 2

Sample Customer Data Base of Key Generation Values

| Resource Name | Value |
| --- | --- |
| PID 1 from SoC1 | AB0100000000C101 |
| ESSK Common | 2387218BC879F10D1000468141707269 |
| ESSK Unique | CF1FEF0F7001AC8CD04C02739FFC199A |
| Key Gen Data for Customer1 | AB0100000000C101 |
| Derived RKKLO Common | 12185681AF6ABFE6F715C0BC1062BBE9 |
| Derived RKKLO Unique | A421C5929E958E8550941173782255D3 |
| Key Gen Data for Customer2 | AB0100000000C101 |
| Derived RKKLO Common | A17A4C7969D50F560D2B09ACD41DBAD1 |
| Derived RKKLO Unique | 4C201DBCC02F701DF99B11B44873FF341 |
| PID 2 from SoC2 | AB0100000000C102 |
| ESSK Common | 2387218BC879F10D1000468141707269 |
| ESSK Unique | D04C02739FFC199A7001AC8CD04C0273 |
| Key Gen Data for Customer1 | AB0100000000C102 |
| Derived RKKLO Common | 12185681AF6ABFE6F715C0BC1062BBE9 |
| Derived RKKLO Unique | 37406CB9C049761BE6F002019BBAC4D9 |
| Key Gen Data for Customer2 | AB0100000000C102 |
| Derived RKKLO Common | A17A4C7969D50F560D2B09ACD41DBAD1 |
| Derived RKKLO Unique | 60B69C82F671C7D89CFCC316B0EABC5A |

A final step in the root key 516 generation process is performed by the module key generator 532, which accepts a Module ID, which is a specific end point for the destination operation of the RKKLO 516, i.e. for use in PVR, Mem-2-mem, or Content protection operations. The content provider 102 provides this input and the black box security provider does not know the input.

The elements of the TEE 158 illustrated in FIG. 5 include:

a) CAS/DRM Separation Function Generator (CSF) 526: The CSF 526 creates the SoC 114 and content provider 102 (or customer) specific derived seed keys b) Intermediate Seed Key Generator (IKG) 536: The IKG 536 creates SoC, content provider 102 (or customer), and CA specific derived seed keys.

c) Module Key Generation (MKG) 532: The MKG 532 creates the module and SoC specific root key 516 generation as specified and required by content provider 102. Modules selection allows different key values to be generated for several different type of key usage in the SoC 114. For example, module identifier 1 could be used for Control Word (CW) operations, module identifier 2 could be memory-to-memory operations, and module identifier 3 could be DVR operations. Thus module separation provides differently derived root keys 516 for distinct root key 516 output usages or operations.

d) Root Key Generation (RKG) 538. This function creates the SoC 114 and content provider 102 (or Customer) specific derived final seed keys based on the CAS/DRM vendor (prior to module generation if performed by the Customer).

Algorithms for these functions are specified in Algorithm Definition section below.

Ownership of Data

1. Black Box Security Provider
   a. Black box OTP Secrets and Chip Unique ID

| | | |
|---|---|---|
| i. | Product Identifier or Chip Unique ID | 64 bits |
| ii. | Customer Product Secret (CPS) Array Common | 256 bits |
| iii. | Secret SoC Key (SSK) Common | 128 bits |
| iv. | Secret SoC Key (SSK) Unique | 128 bits | b. CPS 524
      i. Value calculated from CPS 524 array programmed by the black box 116
      ii. Configurable and Customer Unique as defined in signed Certificate 506
   c. CA_ID
      i. Assigned by the black box security provider and given to Customer 102
      ii. Enters TEE 158 through a signed Certificate 508
   d. ESSK 504 Programmed by the black box
      i. Either SSK-Common or SSK Unique
   e. $SSK_{Customer}$ 534 derived by the black box security provider based on
      i. ESSK 504
      ii. OTP Config Certificate 506, CA ID Certificate 508
      iii. Algorithm configuration parameters in signed Certificate 508

2. Content Provider 102 (or Customer)
   a. Root Key 516 for Key Ladder Operations derived by Customer 102 based on
      i. $SSK_{Customer}$, is given by the black box security provider.
      ii. Depends also on Module_ID input;
         1. OTP Config Certificate 506, CA ID Certificate 508 are software values loaded and specified by the black box security provider
         2. Module_ID 510 is a software loaded value chosen by Customer
   b. JTAG derived by Customer based on
      i. OTP Config Certificate 506

Algorithm Definition

This section defines the algorithms used in key generators 536, 538 and 532.

It is assumed that a number of indexed public keys may be loaded and stored in the SoC 114. It is also assumed that the TEE 158 will have access to these keys to decrypt and verify the certificates 506, 508 used in the operations discussed in the previous section.

Any cryptographic algorithm or combination of algorithms can be used to implement the functions. Samples of these algorithms include: AES, CSA, CSA2, CSA3, DES, triple DES, Idea, etc. The encrypt/decrypt mode will be defined in the certificate The following AES function definition will be used to define the associated key and data:

$Algorithm_{key}(data)$

CAS/DRM Separation Function (CSF) Module 526

The CSF 526 accepts the 64-bit (for example) CA Identifier (CA_ID) 508 as data and the 128-bit (for example) CPS 524 as key to produce CAS/DRM_profile_key 528. The algorithm parameters are contained in the CA_ID_AlgSelect_Certificate 508.

$$CSF = Algorithm_{CPS}(CA\ \text{Identifier})$$
$$= CAS/DRM\_profile\_key$$

Intermediate Seed Key Generator (IKG) 536

The IKG 536 accepts the 64-bit CA Identifier (CA_ID) 508 as input data and the 128-bit (for example) SSK as key to produce an intermediate value. The algorithm parameters are contained in the CA_ID_AlgSelect_Certificate 508.

$$IKG = Algorithm_{SSK}(CA\ \text{Identifier})$$
$$= \text{Intermediate value}$$

Root Key Generator (RKG) 538

The RKG 538 accepts the CAS/DRM_profile_key 528 as input data and the 128-bit $SSK_{Customer}$ 534 as a key. The results of the cryptographic operation are exclusive ORed (for example) with CAS/DRM_profile_key to produce $SSK_{Customer}$ 534. The algorithm parameters are contained in the CA_ID_AlgSelect_Certificate 508.

$$RKG = [Algorithm_{IKGoutput}(CAS/DRM\_profile\_key)] \otimes$$
$$CAS/DRM\_profile\_key$$
$$= SSK_{Cutomer}534$$

Module Key Generator (MKG) 532

The MKG 532 takes as input the Module ID 510 encoded as, 0x01000000 000000MM 0200000000 000000MM, etc. (where MM is the 8-bit Module ID 510) and the 128-bit $SSK_{Customer}$ as key to produce the root key for the key-ladder.

$$MKG = [Algorithm_{SSKcustomer}(\text{Module } ID)$$
$$= \text{Root Key for Key Ladder Operations}(RKKLO\ 516)$$

JTAG Generation

The JTAG Generation Function takes as input the OTP Config Certificate and the 128-bit $SSK_{Customer\_Seed}$ as key to produce Customer and SoC specific JTAG unlock key.

JTAG: Algorithm$_{SSKCustomer\_Seed}$ (SSK$_{Customer\_Seed}$)= Key$_{intermediate}$
Algorithm=Key$_{intermediate}$ (OTP Config Certificate)= Customer Specific Unlock Key

SoC Manufacturing Operations

The black box delivers the values described in the following subsections to be written into the SoC OTP.
Secret SoC Keys Stored in OTP The black box 116 programs the ESSK 504 during SoC manufacturing. For maintaining the highest level of security, the ESSK 504 cannot be exported outside the TEE 158 or read by the main SoC 114 processor. The SoC hardware must lock down access to this value, thereby, restricting access our side the security processor or TEE 158. The processing of the decrypted Customer supplied key, in this case referred to as the content protection key cannot be returned to software. In a high security mode or operation, the ability to export the decrypted content protection key outside the TEE 158 software must be blocked.

In one embodiment, two ESSKs 504 are stored in the SoC 114 and are used for key generation:

| | |
|---|---|
| Encrypted (or obfuscated) Secret SoC Key (ESSK) Common | 128 bits |
| Encrypted (or obfuscated) Secret SoC Key (ESSK) Unique | 128 bits |

Customer Product Secret (CPS) Array Stored in OTP

The array of OCPS 518 data stored in OTP 152B to provide Content Provider 102 specific (i.e. Customer independent) entropy to the CAS vendor separation function used to construct the CPS 524 input. Each content provider 102 will have a unique index into this array and hash value inputs to generate a unique 128 bit (for example) CPS 524 value used for key generation.

Trusted Execution Environment (TEE) Support

The TEE 158 supports the functions necessary to add, remove and maintain security profiles for independent CAS/DRM providers. The TEE 158 has an application loaded during the initial CE device manufacturing 112. Security profiles will be added, which may be updated and removed when the CE device 112 is in the field. It should be noted that all operations and functions executing in the high security TEE 158 could be executed in the common processor (CPU 150) will a lower level of security and lower level of protection for content.

The TEE 158 natively supports switching between content provider applications and CAS/DRM security profiles by allowing content switching between application processes. This occurs when the consumer 110 desires to switch channels/streams/applications or visits a web site of a different content provider 102 to watch a new program on the CE device 112.

Services utilizing the Key Generation scheme will accept an encrypted and signed content and/or security provider 108B application (i.e. client application) to be loaded and verified by the TEE 158. A given client application has a unique OTP_Def_Certificate 506/CA_ID_Certificate pair. The client application for a content provider 102 wishing to make their content available on the CE device 112 performs the following operations to decrypt content as defined in this section.

The following paragraphs provide an overview of the TEE 158 support functions.

a) Process Separation for Separate CAS/DRM

The TEE 158 implements process separation for separate CAS/DRM applications that are either built into the application loaded during CE device 112 manufacturing or downloaded to the CE device 112 when it is in the field. The application must specify a CAS/DRM Context before it may use the TEE 158. All operations requested by the application must reference the Context.

b) Decrypt and Verify the CAS/DRM Client Application

The TEE 158 provides a mechanism to decrypt and verify the CAS/DRM client application. Each CAS/DRM client must establish a context with the TEE 158 to utilize the features provided.

c) Load Encrypted and Signed CAS/DRM Client Application

The TEE 158 is capable of accepting and loading new CAS/DRM applications that are downloaded to the CE device 112 when the CE device 112 is in the field.

d) Selected OTP_Def_Certificate 506/CA_ID_Certificate Pair

The TEE 158 is capable of selecting and loading a certificate pair for initializing the key generation process for each prospective content provider 102 (i.e. Customer). The CAS/DRM System must select the certificate pair (OTP_Def_Certificate 506/CA_ID_AlgSelect_Certificate 508) to be used for the Context.

The TEE 158 will use the selected OTP_Def_Certificate 506/CA_ID_Certificate 508 pair for this root key 516 generation and security profile context. After a CAS/DRM client establishes a context with the TEE 158 it may utilize the client interface to select the OTP_Def_Certificate 506/CA_ID_Certificate Pair 508. This configuration will be bound to the context for Key Generation.

e) Adding/Replacing OTP_Def_Certificate 506

The TEE 158 will be capable of adding and replacing the OTP_Def_Certificate 506. Each CAS/DRM System has an OTP configuration defined for it. The OTP_Def_Certificate 506 is the mechanism for this definition. The CAS/DRM Application may add or replace its own certificates. This operation requires proof of ownership.

f) Adding/Replacing CA_ID_AlgSelect_Certificate 508

The TEE 158 is capable of adding and replacing the CA_ID_AlgSelect_Certificate 508. Each CAS/DRM System may select from a set of allowed cryptographic operations used in the root key 516 generation process. The CA_ID_AlgSelect_Certificate 508 is the mechanism for this selection. The CAS/DRM Application may add or replace its own certificates. This operation requires proof of ownership.

g) Adding/Replacing Signature Verification

The TEE 158 is capable of adding and replacing Signature verification Public Key signed by the black box security provider Root Key. Each CAS/DRM System has a Public Key signed by the black box security provider Root Key. The CAS/DRM Application may add or replace its own Public Keys. This operation requires proof of ownership.

h) Loading Key Ladder Inputs

The TEE 158 is capable of loading inputs to the key-ladder to implement CAS/DRM security profiles that will be specific to each content provider 102. The TEE 158 implements the interfaces for loading the application specific software values to derive the decryption Control Word used in the process of decrypting content as needed by the CAS/DRM vendor 108B.

After loading the inputs, the TEE 158 performs requested operations for use in the selected CAS/DRM client applications security profile. The TEE 158 combines the certificate configuration and application specific inputs to derive the final Control Word utilizing the Key Ladder 540.

i) Additional Application Specific Key Ladder Inputs

The TEE 158 retrieves the additional application specific Key Ladder inputs for use in the selected CAS/DRM client applications security profile. Typical SoC 114 key ladder implementations require multiple software inputs that are specific to the CAS/DRM system. The CAS/DRM client will utilize the client interface to the TEE 158 to load the inputs.

Exemplary Process Flow

Figure 6:
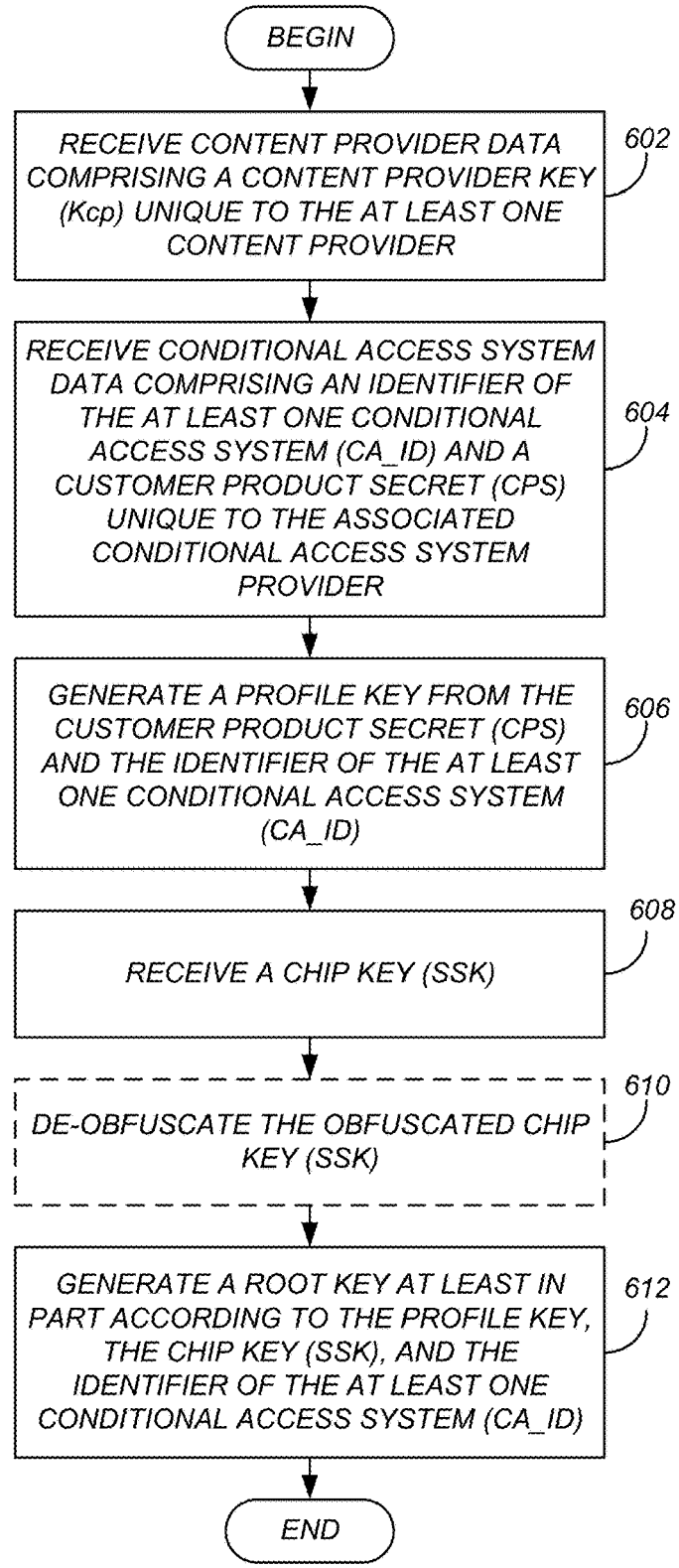
FIG. 6 is a diagram depicting exemplary processing steps that can be used to generate a root key.

FIG. 6 is a diagram depicting exemplary processing steps that can be used to generate a root key using the principles described above. FIG. 6 is discussed in reference to FIG. 5.

In block 602, content provider data comprising a content provider key (Kcp) 550 that is unique to the content provider is received. In one embodiment, this information is received included in the OTP_Def_certificate 506.

In block 604, conditional access system data is received. The conditional access system data comprises an identifier of the conditional access system (CA_ID) and a customer product secret (CPS) 524 that is unique to the conditional access system provider associated with the conditional access system. The conditional access data may be received via a digital certificate such as the CA_ID_AlgSelect_Certificate 508 shown in FIG. 5. In one embodiment, the customer product secret (CPS) 524 is received directly by the TEE 158. In other embodiments, the CPS 524 is computed from other data such as obfuscated CPS (OCPS) 518 received from OCPS OTP 502 and an index 552 received with the OTP_Def_Certificate 506, using, for example, a hash or similar function as further described below with reference to FIG. 8.

In block 606, a profile key 528 is generated from the CPS 524 and the identifier of the conditional access system (CA_ID). The profile key 528 is used to generate the root key 516 as described further below.

In block 608, a secret SoC key (SSK) or chip key 514 is received. In the embodiment illustrated in FIG. 5, the chip key 514 is received in the TEE 158 from SSK OTP 502 as an obfuscated chip key (ESSK) 504, and the obfuscated chip key (ESSK) 504 is de-obfuscated using deobfuscator 522 as shown in block 610 for later use. In this embodiment, the obfuscated chip key (SSK) 504 is essentially a pseudorandom value that is modified by the de-obfuscation process of deobfuscator 522 to provide a content provider unique seed (the chip key (SSK) 504) to begin the process of deriving the root key 516 using the intermediate key generator (IKG) 536, the root key generator (RKG) 538, and the module key generator (MKG) 532 of FIG. 5. The obfuscated chip key (SSK) 504 may be obfuscated by encryption so as to be decrypted using a suitable key. For example, in the illustrated embodiment, the obfuscated chip key 504 is encrypted so as to be decryptable by the content provider key (Kcp), and the deobfuscator 522 decrypts this encrypted chip key (ESSK) 504 using the content provider key (Kcp), as shown in block 610. However, other data may be used to perform this function. In alternative embodiments, the chip key 504 is obfuscated in other ways or combination of ways, including hashing or other logical operations. Although not illustrated, the algorithm or technique by which the chip key (SSK) 504 is deobfuscated can be selected according to an algorithm selection value that is included with the conditional access data (for example, in the CA_ID_AlgSelect digital certificate 508).

Finally, in block 612, the root key 516 is generated at least in part according to the profile key 528, the chip key (SSK) 514, and the identifier of the conditional access system (CA_ID).

Figure 7:
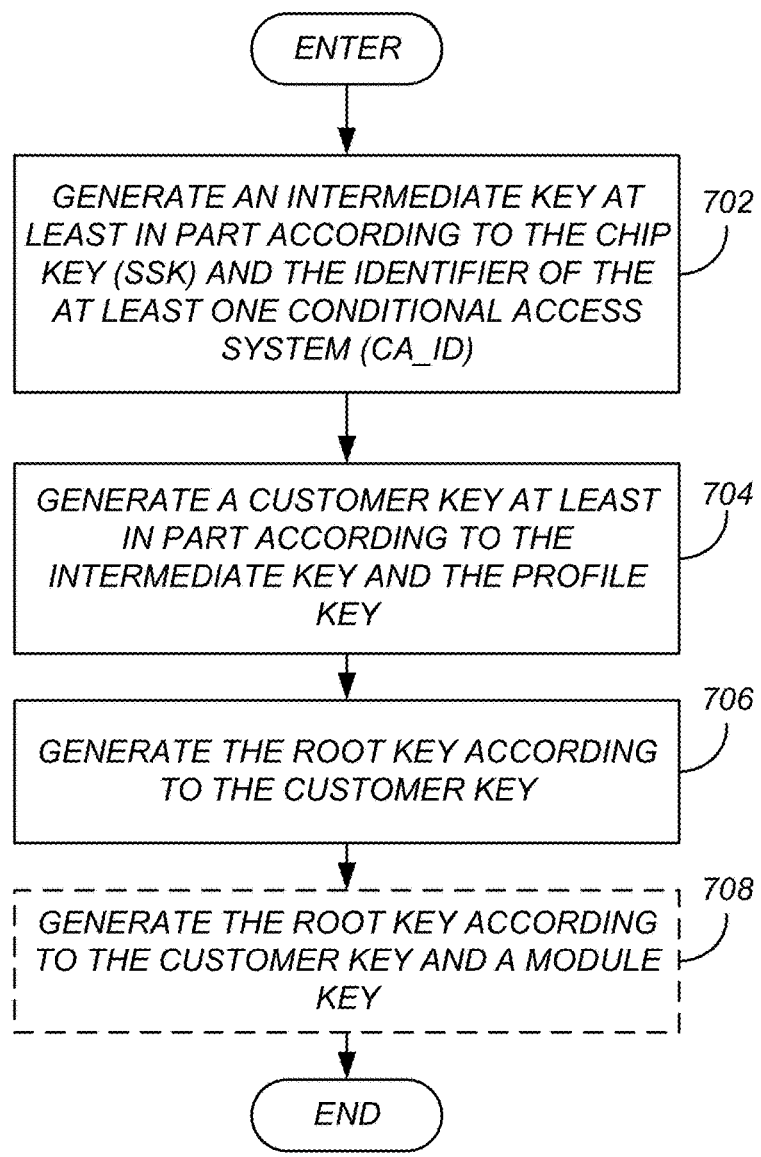
FIG. 7 is a diagram presenting a flow chart of further details regarding the generation of the root key.

FIG. 7 is a diagram presenting a flow chart of further details regarding the generation of the root key 516. In block 702, an intermediate key is generated. This may be accomplished, for example, by the IKG 536 of FIG. 5. In the illustrated embodiment, the intermediate key is generated at least in part according to the chip key (SSK) 514 and the identifier of the conditional access system (CA_ID).

In block 704, a customer key 534 (depicted as $SSK_{customer}$ in FIG. 5) is generated at least in part according to the intermediate key and the profile key 528. In the embodiment illustrated in FIG. 5, this is accomplished by the RKG 530. In one embodiment, the customer key 534 is simply used as the root key 516. However, in an optional embodiment, the root key 516 is generated by further operation using the customer key 534 and a module value such as a module identifier (MODULE_ID) or module key 510. This can be performed by the module key generator 532 of FIG. 5, and is illustrated by block 708 of FIG. 7.

In one embodiment, the conditional access system data includes an algorithm select value in addition to the conditional access system identifier (CA_ID) and the CPS 524. The algorithm select value is provided to one or more of the deobfuscation module 522, the IKG 536, the RKG 538 and the MKG 532. This algorithm select value is used by the module/generator to which it is provided (e.g., the deobfuscation module 522, the intermediate key generator 536, the root key generator 538 and the module key generator 532, respectively) to select which algorithm or processing technique is used to generate the output produced by each module or generator. For example, an algorithm select value of binary 1101 may command the deobfuscation module 522 to generate the deobfuscated chip key 514 by hashing the obfuscated chip key 504 with the content provider key (Kcp), command the IKG 536 to compute the intermediate key from SSK 514 using the CA_ID using an RSA algorithm, command the RKG 530 to compute the customer key 534 from the intermediate key and the profile key using an AES algorithm, and command the MKG 532 to compute the root key 516 from the customer key 534 and MODULE_ID using an a dripple DES algorithm. In another embodiment multiple algorithm selector values may be used, for example, different algorithm selector values may be provided to the deobfuscation module 522, the IKG 536, the RKG 538 and the MKG 532. Thus, any combination of algorithms and processes may be used to perform the functions of the IKG 536, RKG 538, and MKG 532.

Figure 8:
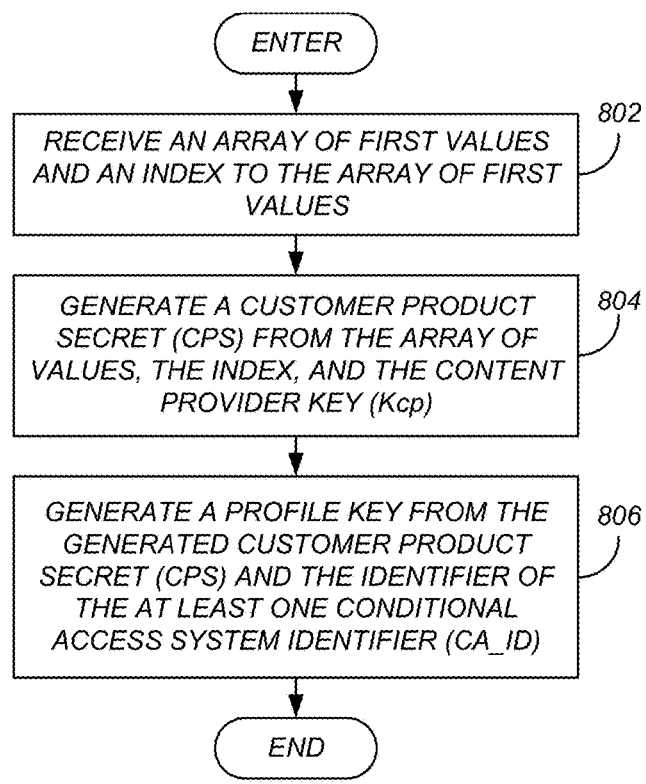
FIG. 8 is a diagram depicting an exemplary embodiment of operations performed to generate the profile key from the CPS and the identifier of the conditional access system (CA_ID)

FIG. 8 is a diagram depicting an exemplary embodiment of operations performed to generate the profile key from the CPS 524 and the identifier of the conditional access system (CA_ID). In blocks 802 and 804, the CPS 524 is generated. This can be accomplished by receiving an array of values and an index to the array of values, then generating the CPS 524 from the array of values, the index and the content provider key 550.

Figure 9:
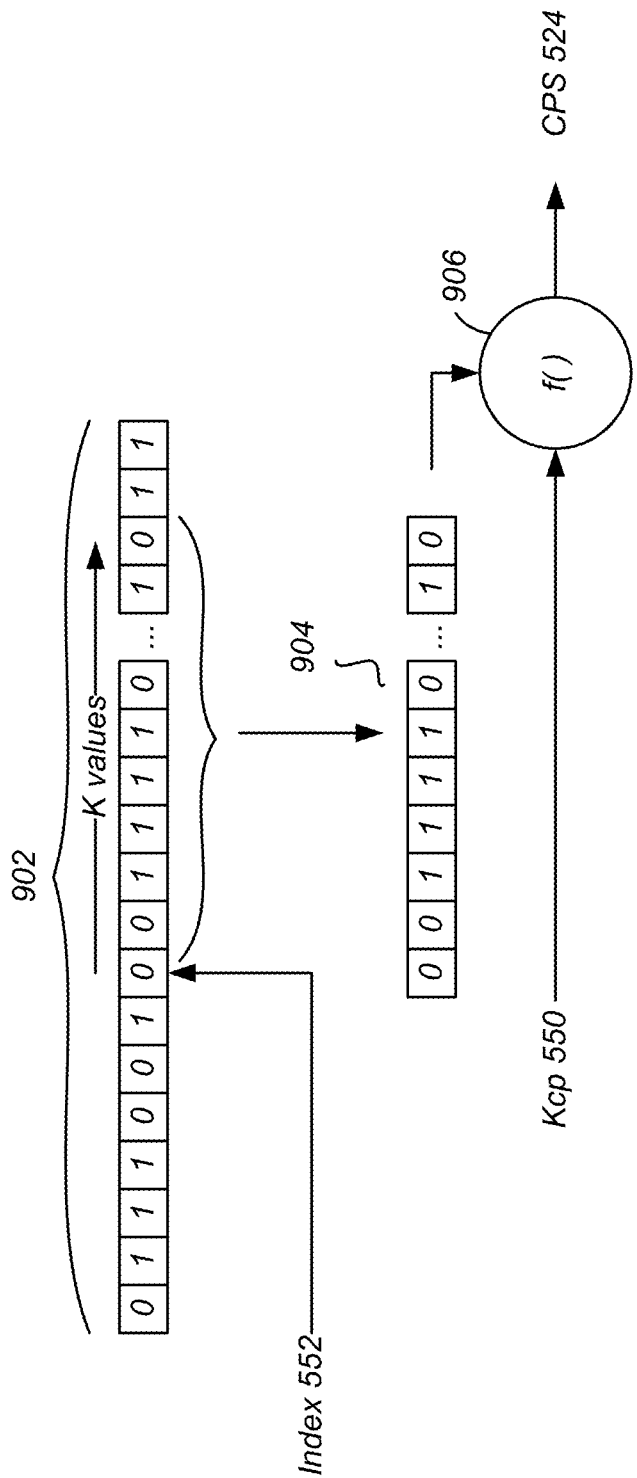
FIG. 9 is a diagram illustrating the one embodiment of how the CPS is generated.

FIG. 9 is a diagram illustrating the one embodiment of how the CPS 524 is generated. An array of values 902, an index 552, and the content provider key (Kcp) 550 are received. The index 552 is used to identify a plurality 904 of the array of values. For example, in the embodiment illustrated in FIG. 9, the index identifies a single value of the array of values 902, and the plurality of the array of values 904 is identified as the K values following the identified value in the ordered array of values 902. The identified plurality of values 904 is then modified according to the content provider key (Kcp) 550 by cryptographic function 906. Cryptographic function 906 may be a hash function, an exclusive OR function, a decrypt function, or any suitable cryptographic function.

Exemplary Computer System

Figure 10:
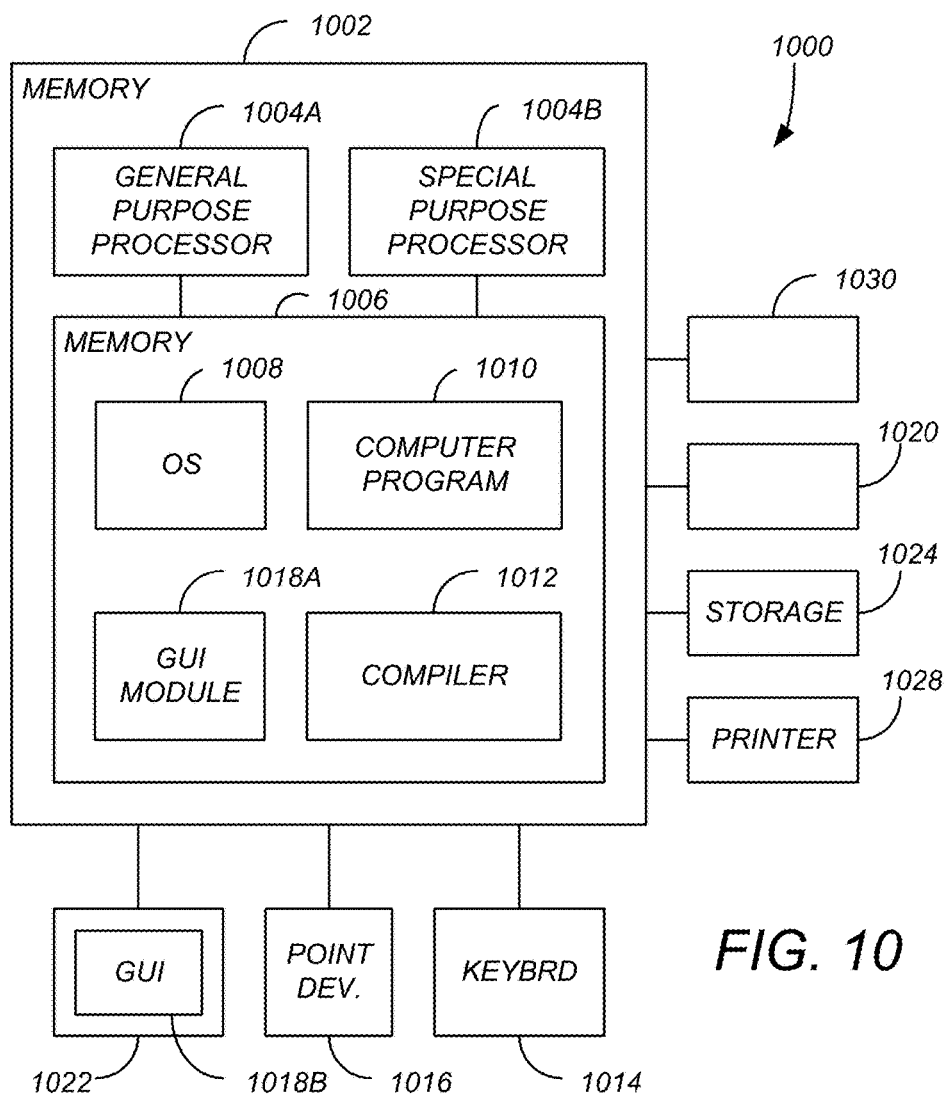
FIG. 10 illustrates an exemplary computer system that could be used to implement the present invention.

FIG. 10 is a diagram illustrating an exemplary computer system 1000 that could be used to implement elements of the present invention, including processing elements at the content provider 102, SoC manufacturer 104, security provider 106, black box 116, CE device assemblers 108A and CA vendor 108B, SoCs 114 and CE device 112.

The computer 1002 comprises a general purpose hardware processor 1004A and/or a special purpose hardware processor 1004B (hereinafter alternatively collectively referred to as processor 1004) and a memory 1006, such as random access memory (RAM). The computer 1002 may be coupled to other devices, including input/output (I/O) devices such as a keyboard 1014, a mouse device 1016 and a printer 1028.

In one embodiment, the computer 1002 operates by the general-purpose processor 1004A performing instructions defined by the computer program 1010 under control of an operating system 1008. The computer program 1010 and/or the operating system 1008 may be stored in the memory 1006 and may interface with the user and/or other devices to accept input and commands and, based on such input and commands and the instructions defined by the computer program 1010 and operating system 1008 to provide output and results.

Output/results may be presented on the display 1022 or provided to another device for presentation or further processing or action. In one embodiment, the display 1022 comprises a liquid crystal display (LCD) having a plurality of separately addressable pixels formed by liquid crystals. Each pixel of the display 1022 changes to an opaque or translucent state to form a part of the image on the display in response to the data or information generated by the processor 1004 from the application of the instructions of the computer program 1010 and/or operating system 1008 to the input and commands. Other display 1022 types also include picture elements that change state in order to create the image presented on the display 1022. The image may be provided through a graphical user interface (GUI) module 1018A. Although the GUI module 1018A is depicted as a separate module, the instructions performing the GUI functions can be resident or distributed in the operating system 1008, the computer program 1010, or implemented with special purpose memory and processors.

Some or all of the operations performed by the computer 1002 according to the computer program 1010 instructions may be implemented in a special purpose processor 1004B. In this embodiment, some or all of the computer program 1010 instructions may be implemented via firmware instructions stored in a read only memory (ROM), a programmable read only memory (PROM) or flash memory within the special purpose processor 1004B or in memory 1006. The special purpose processor 1004B may also be hardwired through circuit design to perform some or all of the operations to implement the present invention. Further, the special purpose processor 1004B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1002 may also implement a compiler 1012 that allows an application program 1010 written in a programming language such as C. COBOL, C++, FORTRAN, or other language to be translated into processor 1004 readable code. After completion, the application or computer program 1010 accesses and manipulates data accepted from I/O devices and stored in the memory 1006 of the computer 1002 using the relationships and logic that was generated using the compiler 1012.

The computer 1002 also optionally comprises an external communication device such as a modem, satellite link, Ethernet card, or other device for accepting input from and providing output to other computers.

In one embodiment, instructions implementing the operating system 1008, the computer program 1010, and/or the compiler 1012 are tangibly embodied in a computer-readable medium, e.g., data storage device 1020, which could include one or more fixed or removable data storage devices, such as a zip drive, floppy disc drive 1024, hard drive, CD-ROM drive, tape drive, or a flash drive. Further, the operating system 1008 and the computer program 1010 are comprised of computer program instructions which, when accessed, read and executed by the computer 1002, causes the computer 1002 to perform the steps necessary to implement and/or use the present invention or to load the program of instructions into a memory, thus creating a special purpose data structure causing the computer to operate as a specially programmed computer executing the method steps described herein. Computer program 1010 and/or operating instructions may also be tangibly embodied in memory 1006 and/or data communications devices 1030, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1002.

Although the term "computer" is referred to herein, it is understood that the computer may include portable devices such as cellphones, tablet, television, smart television, portable MP3 players, video game consoles, notebook computers, pocket computers, or any other device with suitable processing, communication, and input/output capability.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. In a system comprising at least one of a plurality of content providers providing media programs to consumers encrypted according to at least one of a plurality of conditional access systems provided by an associated conditional access system provider, a method of providing a root key, comprising:
   (a) receiving content provider data unique to the at least one content provider;
   (b) receiving conditional access system data comprising an identifier of the at least one conditional access system (CA_ID) and a customer product secret (CPS) unique to the associated conditional access system provider;
   (c) generating a profile key from the customer product secret (CPS) and the identifier of the at least one conditional access system (CA_ID);
   (d) receiving a chip key (SSK);
   (e) generating a root key at least in part according to the profile key, the chip key (SSK), the content provider data, and the identifier of the at least one conditional access system (CA_ID); and
   (f) decrypting at least one the media programs at least in part according to the root key, wherein the at least one of the media programs at least in part is encrypted according to a content key, wherein decrypting the at least one of the media programs at least in part according to the root key comprises:
      (1) generating the content key from the root key;
      (2) decrypting the at least one of the media programs at least in part according to the content key.

2. The method of claim 1, wherein:
the chip key (SSK) is received in obfuscated form from a one-time programmed memory of a chip; and
the method further comprises de-obfuscating the obfuscated chip key (SSK) according to the content provider data.

3. The method of claim 2, wherein:
the content provider data comprises a content provider key (Kcp) unique to the at least one content provider;
the chip key (SSK) is deobfuscated according to the content provider unique key (Kcp).

4. The method of claim 2, wherein:
the conditional access system data further comprises an algorithm selection value;
de-obfuscating the obfuscated chip key comprises:
   deobfuscating the obfuscated chip key (SSK) according to an algorithm selection value.

5. The method of claim 1, wherein (c) and (e) are performed in a trusted execution environment of a system on a chip (SoC).

6. The method of claim 5, wherein the chip key (SSK) is programmed into the SoC.

7. The method of claim 5, wherein the chip key (SSK) is unique to a SoC product family.

8. The method of claim 5, wherein the chip key (SSK) is unique to each SoC.

9. The method of claim 1, wherein:
the conditional access system data further comprises an algorithm selection value; and
generating a root key at least in part according to the profile key, the chip key (SSK), the content provider data, and the identifier of the at least one conditional access system (CA_ID) comprises:
   generating an intermediate key at least in part according to the chip key (SSK), the identifier of the at least one conditional access system (CA_ID), and the algorithm selection value;
   generating a customer key at least in part according to the intermediate key, the profile key and the algorithm selection value; and
   generating the root key according to the customer key.

10. The method of claim 9, wherein:
the root key is further generated according to a module value;
generating the root key according to the customer key comprises:
generating the root key according to the customer key and the module value.

11. The method of claim 1, wherein the content provider data further comprises the customer product secret (CPS).

12. The method of claim 1, wherein;
the content provider data comprises a content provider key (Kcp) unique to the at least one content provider; and
generating a profile key from the customer product secret (CPS) and the identifier of the at least one conditional access system comprises:
   (c1) generating the customer product secret (CPS), comprising:
      receiving an array of first values and an index to the array of first values;
      generating the customer product secret (CPS) from the array of values, the index, and the content provider key (Kcp);
   (c2) generating a profile key from the generated customer product secret (CPS) and the identifier of the at least one conditional access system identifier (CA_ID).

13. The method of claim 12, wherein generating a customer product secret (CPS) from the array of values, the index, and the content provider key (Kcp) comprises:
selecting a subset of the array of values according to the index; and
hashing the subset of the array values with the content provider key.

14. The method of claim 13, wherein:
(c) and (e) are performed in a trusted execution environment of a system on a chip (SoC);
the array of first values are one time programmed permanently into the system on a chip (SoC) and are received from the SoC in the trusted execution environment;
the content provider data is included within an encrypted digital certificate;
receiving content provider data comprising a content provider key (Kcp) unique to the at least one content provider comprises decrypting the digital certificate;
the conditional access system data is included within a second encrypted digital certificate; and
receiving the conditional access system data comprises decrypting the second digital certificate.

15. In a system comprising at least one of a plurality of content providers providing media programs to consumers encrypted according to at least one of a plurality of conditional access systems provided by an associated conditional access system provider, an apparatus for providing a root key, comprising: a processor;
a memory communicatively coupled to the processor, the memory storing instructions comprising instructions for:
   (a) receiving content provider data unique to the at least one content provider;
   (b) receiving conditional access system data comprising an identifier of the at least one conditional access system (CA_ID) and a customer product secret (CPS) unique to the associated conditional access system provider;
(c) generating a profile key from the customer product secret (CPS) and the identifier of the at least one conditional access system (CA_ID);
(d) receiving a chip key (SSK);
(e) generating a root key at least in part according to the profile key, the chip key (SSK), the content provider data, and the identifier of the at least one conditional access system (CA_ID); and
(f) decrypting at least one of the media programs at least in part according to the root key, wherein the at least one of the media programs at least in part is encrypted according to a content key, wherein decrypting the at least one of the media programs at least in part according to the root key comprises:
(1) generating the content key from the root key;
(2) decrypting the at least one of the media programs at least in part according to the content key.

16. The apparatus of claim 15, wherein:
the chip key (SSK) is received in obfuscated form from a one time programmed memory of a chip; and
the instructions further comprise instructions for de-obfuscating the obfuscated chip key (SSK) according to the content provider data.

17. The apparatus of claim 16, wherein:
the content provider data comprises a content provider key (Kcp) unique to the at least one content provider; and
the chip key (SSK) is deobfuscated according to the content provider unique key (Kcp).

18. The apparatus of claim 15, wherein the processor comprises a system on a chip (SoC) and instructions for performing (c) and (e) are executed in a trusted execution environment of the system on a chip (SoC).

19. The apparatus of claim 15, wherein:
the conditional access system data further comprises an algorithm selection value; and
the instructions for generating a root key at least in part according to the profile key, the chip key (SSK), the content provider data, and the identifier of the at least one conditional access system (CA_ID) comprise instructions for:
generating an intermediate key at least in part according to the chip key (SSK), the identifier of the at least one conditional access system (CA_ID), and the algorithm selection value;
generating a customer key at least in part according to the intermediate key, the profile key and the algorithm selection value; and
generating the root key according to the customer key.

20. The apparatus of claim 19, wherein:
the root key is further generated according to a module value;
the instructions for generating the root key according to the customer key comprise instructions for:
generating the root key according to the customer key and a module value.

21. The apparatus of claim 15, wherein:
the content provider data comprises a content provider key (Kcp) unique to the at least one content provider; and
the instructions for generating a profile key from the customer product secret (CPS) and the identifier of the at least one conditional access system comprise instructions for:
(c1) generating the customer product secret (CPS), comprising instructions for:
receiving an array of first values and an index to the array of first values;
generating the customer product secret (CPS) from the array of values, the index, and the content provider key (Kcp);
(c2) generating a profile key from the generated customer product secret (CPS) and the identifier of the at least one conditional access system identifier (CA_ID).

22. The apparatus of claim 21, wherein the instructions for generating a customer product secret (CPS) from the array of values, the index, and the content provider key (Kcp) comprise instructions for:
selecting a subset of the array of values according to the index; and
hashing the subset of the array values with the content provider key.

23. The apparatus of claim 22, wherein:
(c) and (e) are performed in a trusted execution environment of a system on a chip (SoC);
the array of first values are one time programmed permanently into the system on a chip (SoC) and are received from the SoC in the trusted execution environment;
the content provider data is included within an encrypted digital certificate;
the instructions for receiving content provider data comprising a content provider key (Kcp) unique to the at least one content provider comprises decrypting the digital certificate;
the conditional access system data is included within a second encrypted digital certificate; and
the instructions for receiving the conditional access system data comprises decrypting the second digital certificate.

* * * * *